United States Patent
Lahrmann et al.

(10) Patent No.: US 12,097,744 B2
(45) Date of Patent: Sep. 24, 2024

(54) CLOSURE ELEMENT FOR A BALL-AND-SOCKET JOINT, AND BALL-AND-SOCKET JOINT HAVING A CLOSURE ELEMENT OF THIS KIND

(71) Applicant: ZF Friedrichshafen AG, Friedrichshafen (DE)

(72) Inventors: Tobias Lahrmann, Osnabrück (DE); Jan Duetz, Wangerland (DE); Thomas Kramer, Oldenburg (DE); Arnold Blanke, Damme (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 124 days.

(21) Appl. No.: 17/600,453

(22) PCT Filed: Mar. 4, 2020

(86) PCT No.: PCT/EP2020/055717
§ 371 (c)(1),
(2) Date: Sep. 30, 2021

(87) PCT Pub. No.: WO2020/200614
PCT Pub. Date: Oct. 8, 2020

(65) Prior Publication Data
US 2022/0169087 A1 Jun. 2, 2022

(30) Foreign Application Priority Data
Apr. 2, 2019 (DE) .................. 10 2019 204 658.4

(51) Int. Cl.
*F16C 11/06* (2006.01)
*B60G 7/00* (2006.01)

(52) U.S. Cl.
CPC .......... *B60G 7/005* (2013.01); *F16C 11/0642* (2013.01); *F16C 11/0657* (2013.01); *B60G 2204/416* (2013.01)

(58) Field of Classification Search
CPC .............. F16C 11/0623; F16C 11/0642; F16C 11/0647; F16C 11/0657; F16C 11/106;
(Continued)

(56) References Cited

U.S. PATENT DOCUMENTS 4,626,121 A * 12/1986 Tajima .................. F16C 11/086
403/138
4,679,957 A * 7/1987 Bauer ................. F16C 11/0619
403/115
(Continued)

FOREIGN PATENT DOCUMENTS

DE 101 10 738 C1 11/2002
DE 101 61 671 A1 6/2003
(Continued)

OTHER PUBLICATIONS

Translated description of DE 10110738 C1. Burger, Friedhelm. Ball Joint Steering Mechanism and Associated Position Sensor Arrangement for Motor Vehicle Use Has a Robust Arrangement of Permanent Magnet Signaler Whose Movement Is Detected by a Sensor. Nov. 7, 2002.*
(Continued)

*Primary Examiner* — Amber R Anderson
*Assistant Examiner* — Kevin J Baynes
(74) *Attorney, Agent, or Firm* — Finch & Maloney PLLC

(57) ABSTRACT

A closure element (1, 28) for a ball joint (16) in a vehicle. The closure element has a receptacle (2, 29) for accommodating an electronic component (6). To be able to reduce the effort and cost of creating an interface, between the closure element and the electronic component, the closure element
(Continued)

(1, 28) has a receptacle (2, 29) which is made of a plastic material and is injection-molded onto one side (3) of the closure element (1).

11 Claims, 6 Drawing Sheets

(58) Field of Classification Search
    CPC ............ B60G 17/019; B60G 2204/116; B60G 2204/1162; B60G 7/005; B60G 2204/416
    See application file for complete search history.

(56) References Cited

U.S. PATENT DOCUMENTS

| | | | | |
|---|---|---|---|---|
| 4,986,689 A * | 1/1991 | Drutchas | ............... | F16C 11/106 403/135 |
| 5,676,485 A * | 10/1997 | Lee | ............... | F16C 11/069 403/50 |
| 7,048,461 B2 * | 5/2006 | Williams | ............ | F16C 11/0647 403/135 |
| 7,063,480 B2 | 6/2006 | Ersoy et al. | | |
| 7,170,285 B2 * | 1/2007 | Spratte | ............... | F16C 41/007 324/207.21 |
| 7,405,557 B2 * | 7/2008 | Spratte | ............... | B60G 17/015 324/261 |
| 7,476,050 B2 * | 1/2009 | Ditzler | ............... | E02F 9/006 92/135 |
| 7,695,212 B2 * | 4/2010 | Spratte | ............... | B60G 17/019 403/135 |
| 7,762,736 B2 * | 7/2010 | Ersoy | ............... | B60D 1/30 403/132 |
| 7,841,799 B2 * | 11/2010 | Spratte | ............... | F16C 11/0604 403/130 |
| 7,926,826 B2 * | 4/2011 | Hayakawa | ............. | B62D 7/163 280/93.5 |
| 8,008,910 B2 * | 8/2011 | Booth | ............... | E05F 15/622 324/207.2 |
| 8,342,560 B2 * | 1/2013 | Albers | ............... | B60D 1/065 280/511 |
| 8,684,621 B2 * | 4/2014 | Forthaus | ............. | F16C 11/0638 403/135 |
| 8,753,032 B2 * | 6/2014 | Yu | ............... | F16C 11/0647 403/90 |
| 9,422,973 B2 * | 8/2016 | Murata | ............... | F16C 11/0623 |
| 9,518,602 B2 * | 12/2016 | Forthaus | ............. | F16C 11/0647 |
| 10,119,894 B2 * | 11/2018 | Holmes | ............... | F16C 11/0647 |
| 2006/0029461 A1 * | 2/2006 | Benick | ............... | F16C 11/0647 403/122 |
| 2008/0193207 A1 * | 8/2008 | Kruse | ............... | G01M 3/26 700/13 |
| 2008/0199247 A1 * | 8/2008 | Spratte | ............... | F16C 41/00 403/27 |
| 2008/0309324 A1 | 12/2008 | Stuve et al. | | |
| 2008/0315867 A1 * | 12/2008 | Spratte | ............... | F16C 11/0647 324/207.13 |
| 2011/0153157 A1 * | 6/2011 | Klank | ............... | B60G 7/005 701/37 |
| 2012/0170969 A1 | 7/2012 | Forthaus et al. | | |

FOREIGN PATENT DOCUMENTS

| | | |
|---|---|---|
| DE | 10 2016 210 406 A1 | 12/2017 |
| DE | 10 2016 215 416 A1 | 2/2018 |
| EP | 1 173 685 B1 | 1/2002 |
| FR | 3036751 B1 * | 6/2017 |

OTHER PUBLICATIONS

Translated description of DE 102016215416 A1. Holtheide, Josef. Sensor Device for a Ball Joint. Feb. 22, 2018.*
German Office Action Corresponding to 10 2019 204 658.4 mailed Oct. 28, 2020.
International Search Report Corresponding to PCT/EP2020/055717 mailed Jun. 5, 2020.
Written Opinion Corresponding to PCT/EP2020/055717 mailed Jun. 5, 2020.

* cited by examiner

CLOSURE ELEMENT FOR A BALL-AND-SOCKET JOINT, AND BALL-AND-SOCKET JOINT HAVING A CLOSURE ELEMENT OF THIS KIND

This application is a National Stage completion of PCT/EP2020/055717 filed Mar. 4, 2020, which claims priority from German patent application serial no. 10 2019 204 658.4 filed Apr. 2, 2019.

FIELD OF THE INVENTION

The invention relates to a closure element for a ball joint of a vehicle, having a receptacle for the accommodation of an electronic component. In addition the invention relates to a ball joint with a closure element of this type.

BACKGROUND OF THE INVENTION

Such a closure element and ball joint is known from DE 10 2016 215 416 A1. In that case the closure element is made of aluminum and the receptacle is made integrally with the closure element. The receptacle is produced by an undercut-producing deformation of the closure element itself. Mechanically connected to the receptacle of the closure element is an electronic component designed as a plug. In this case the plug is held in the receptacle by virtue of a snap-in or latch connection.

In this, it is disadvantageous that the processing of the metallic closure element to form the receptacle is undesirably elaborate and costly due to the deformations required.

SUMMARY OF THE INVENTION

The purpose of the present invention is to develop further a closure element and/or a ball joint of the type mentioned at the start, in such manner that the effort and cost for producing an interface between the closure element and the electronic component can be reduced. In particular, an alternative embodiment should be provided.

The objective upon which the invention is based is achieved by a closure element and a ball joint according to the independent claim(s). Preferred further developments of the invention emerge from the subordinate claims and from the description given below.

The closure element is designed for a ball joint in a vehicle. In particular, the closure element and/or the ball joint is designed as a chassis component in a chassis of a motor vehicle. Thus, the ball joint and/or the closure element can be part of the chassis and/or of a chassis component. In automotive engineering ball joints are used in many ways. Especially in chassis, ball joints serve to articulate chassis parts or components such as control arms, wheel carriers, track rods or the like to one another or to the vehicle body or to an axle support attached thereto.

The closure element has a receptacle for the accommodation of an electronic component. In particular, the electronic component is in the form of a sensor element, a plug or a plug connection. The electronic component can co-operate with a magnet or with some other electronic component to form a sensor device. For example, the magnet or the other electronic component can be associated with an internal joint portion of the ball joint. By means of such a sensor device, it is possible for example to determine the position of the internal joint portion in the ball joint. A corresponding sensor device can be in the form of an angle sensor device.

The receptacle is made of a plastic material and injection-molded onto one side of the closure element.

Here, it is advantageous that the receptacle for holding the electronic component does not have to be produced by deformation of the in particular metallic closure element. Instead the receptacle, in the form desired in each case, can be produced by injection-molding onto one side of the closure element. In that way the effort and costs for producing an interface between the closure element and the electronic component can be reduced. In particular, the receptacle and/or the plastic material is injection-molded onto one side and/or onto a single side of the closure element. In this case the receptacle can be injection-molded only onto part of the side of the closure element. Thus, another part of the side of the closure element can be left uncovered by the plastic material.

Preferably, the side of the closure element with the receptacle is an outer and/or top surface. In a ball joint having the closure element, the receptacle can be located on a side of the closure element that faces away from a joint interior of the ball joint. In particular, the side is flat or planar. This creates a flat or planar contact area between the side of the closure element and the receptacle and/or the plastic material of the receptacle.

In a further development, an edge of the closure element projects beyond the receptacle. In particular, the edge of the closure element projects beyond the receptacle radially relative to a central longitudinal axis of the closure element. Preferably, the edge is designed to hold the closure element onto a joint housing. In this case, the ball joint and/or the chassis component can comprise the joint housing. The projecting and/or protruding edge of the closure element is thus a partial area of the closure element and/or the side of the closure element which is not covered by the plastic material of the receptacle. Accordingly, the projecting and/or protruding edge of the closure element can be in direct contact with the joint housing to enable the closure element to be connected to the joint housing. To hold the closure element on the joint housing, the edge of the closure element can co-operate preferably directly with the joint housing. In particular, the edge is fitted and/or adhesively bonded into a holding groove of the joint housing. In this case the holding groove of the joint housing can be produced by deformation and/or by rolling. The edge of the closure element can be circular or annular.

Preferably, a material-merged, cohesive connection is formed between the side of the closure element and the receptacle. Thus, the receptacle can be joined to the side of the closure element in a cohesive manner. In particular, an adhesion-promoting agent is arranged between the side of the closure element and the receptacle. Alternatively or in addition, in the area or part-area envisaged for contacting the receptacle, the side of the closure element can be pre-treated by a plasma process. By means of an adhesion-promoting agent and/or a plasma treatment, the cohesive connection between the in particular metallic closure element and the receptacle made of plastic is improved. In particular, this optimizes the strength and/or load-bearing ability of the cohesive connection.

In a further embodiment, an interlocking connection is formed between the closure element and the receptacle. In particular the connection between the closure element and the receptacle is made both cohesively and with interlock. In this case the interlocked connection can be formed by virtue of an undercut of the closure element.

To produce the interlocking connection the side of the closure element can comprise an elevation, in particular a T-shaped or mushroom-head-shaped elevation arranged centrally relative to a central longitudinal axis of the closure element. The receptacle can be injection-molded onto and/or around the elevation. Preferably, to form the interlocked connection the receptacle engages in a groove of the elevation, radially relative to the central longitudinal axis of the closure element. In particular the groove is annular or ring-shaped. In that way the groove can be made such that it surrounds the central longitudinal axis radially.

According to a further development, at least one opening is arranged in the closure element. The plastic material of the receptacle can extend through this opening to form the interlocked connection. In particular, the opening can be filled with the plastic material of the receptacle. In that way a firm connection of the receptacle to the closure element can be made simply and effectively.

In a further embodiment the receptacle is designed to co-operate with a holding element for fixing the electronic component in the receptacle. In particular, the holding element is made as a separate component. The receptacle and the holding element can be connected to one another by means of a latching and/or snap-in connection, which in particular can be released.

The closure element can be in the form of a covering cap or a closure ring. In particular, the closure element is made of metal such as aluminum. This, in combination with the injection-molded plastic receptacle, forms a hybrid component made from at least two different materials.

Particularly advantageous is a ball joint with a closure element according to the invention. In particular, the ball joint has a joint housing. In this case the closure element is fixed in the joint housing. Preferably, the joint housing is sealed by the closure element. Moreover, the ball joint has an inner joint portion which fits into and can move within the joint housing. Between the joint housing and the inner joint portion a joint shell can be arranged. The inner joint portion can be in the form of a ball pin or a ball sleeve. A section of the pin of the inner joint portion can project out of the joint housing. Furthermore the joint housing can be made open, at least on one side.

Preferably, the ball joint has a joint axis and/or a central longitudinal axis, around which the ball joint and/or the inner joint portion can move. Preferably, the joint axis and/or central longitudinal axis extends in the axial direction of the joint housing. In particular, the ball joint and/or the inner joint portion is rotationally symmetrical relative to the joint axis and/or the central longitudinal axis. The joint axis and/or the central longitudinal axis can pass through a mid-point of the in particular spherical or ball-shaped inner joint portion, preferably a joint ball of the inner joint portion.

In the context of the present application, the expression "radial" can characterize a direction or indeed any direction that extends perpendicularly to the axial direction of the ball joint, the joint axis and/or the central longitudinal axis. In particular, the inner joint portion is fitted and able to rotate and/or tilt in the joint housing and/or joint shell.

Preferably, a movable and/or articulated mounting of the inner joint portion in the joint housing and/or in the joint shell is understood to mean a pivoting movement, a tilting movement and/or a rotating movement. "Tilting" or "swiveling" of the inner joint portion is in particular understood to mean a movement of the inner joint portion relative to the joint housing in which movement a change takes place of an angle enclosed between a longitudinal axis of the inner joint portion and a longitudinal axis of the housing. "Rotation" or "twisting" of the inner joint portion means in particular a movement of the inner joint portion in which, relative to the joint housing, the inner joint portion is rotated about the longitudinal axis of the inner joint portion.

BRIEF DESCRIPTION OF THE DRAWINGS

Below, the invention is explained in greater detail with reference to the figures. In the figures, the same indexes denote the same, similar or functionally equivalent components or elements. The figures show.

DETAILED DESCRIPTION OF THE PREFERRED EMBODIMENTS

Figure 1:
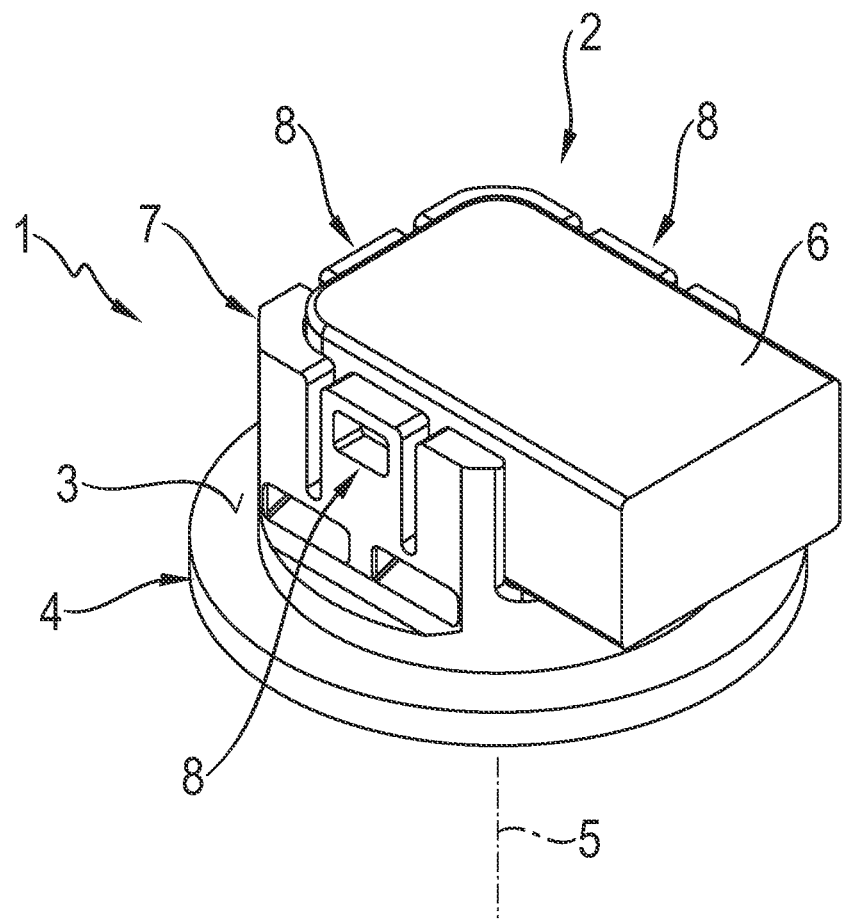
FIG. 1: A perspective side view of a first closure element according to the invention.

FIG. 1 shows a perspective side view of a first closure element 1 according to the invention. In this example embodiment the closure element 1 is in the form of a closure cap, and in this case the closure element 1 is made of aluminum. In addition the closure element 1 comprises a receptacle 2. The receptacle 2 is made of a plastic material. Furthermore, the receptacle 2 is injection-molded onto one side 3 of the closure element 1.

Thus, overall this constitutes a hybrid component made with the metallic closure element 1 in combination with the receptacle 2 made from the plastic material. In this example embodiment, the receptacle 2 is connected cohesively to the side 3 of the closure element 1. To improve the cohesive connection, an adhesion-promoting agent can be used, or before the injection-molding of the receptacle 2 a plasma pre-treatment of the partial area of the side 3 designed to contact the plastic material for the receptacle 2 can take place.

The closure element 1 has an edge 4. The edge 4 projects radially relative to a central longitudinal axis 5 of the closure element 1, outward beyond the receptacle 2. To hold the closure element 1, the edge 4 is formed on a joint housing (not shown here).

The receptacle 2 is designed to accommodate an electronic component 6. In this example embodiment, the electronic component 6 is in the form of a sensor element.

In this example embodiment, the receptacle 2 has an essentially U-shaped border 7. The electronic component 6 has an external contour or design that corresponds to the border 7, such that the electronic component 6 is set into the border 7. Due to the U-shaped design of the border 7, the border has three sides. Each of the three sides of the border 7 has a latching opening 8.

Figure 2:
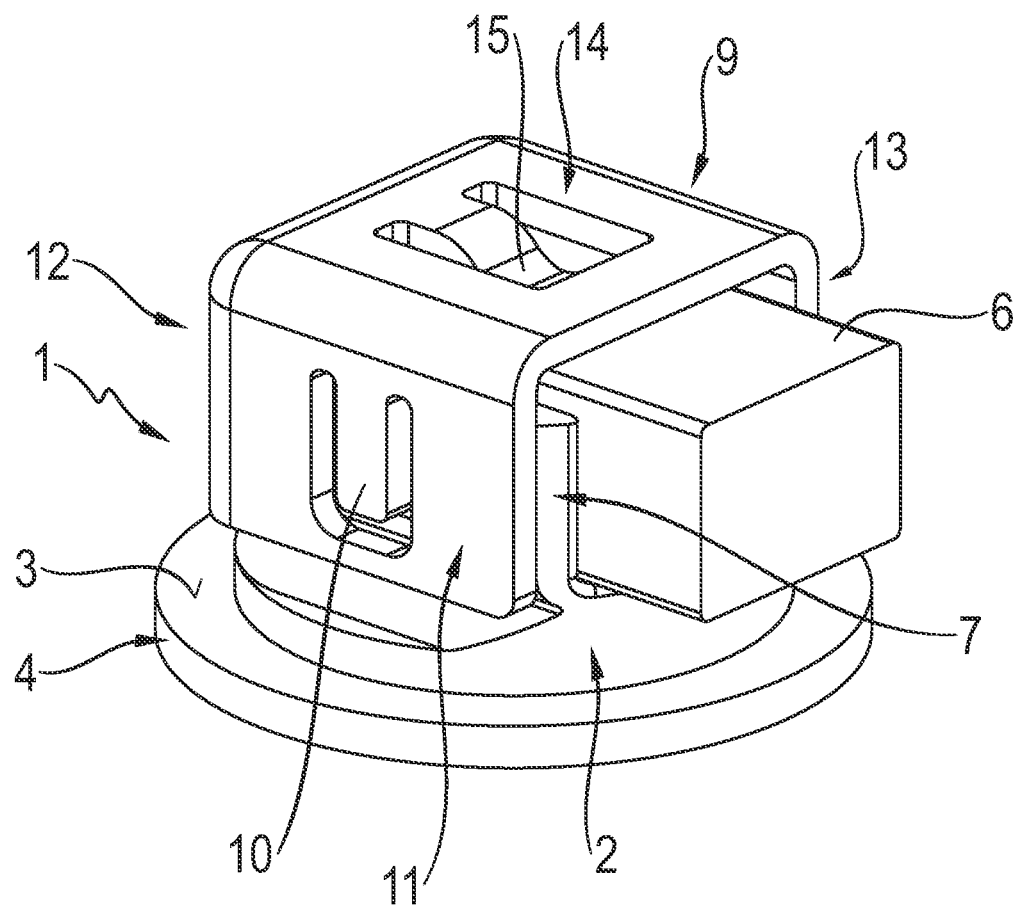
FIG. 2: A further perspective side view of the first closure element according to the invention shown in FIG. 1, with an additional holding element.

FIG. 2 shows a further perspective side view of the first closure element 1 according to the invention, shown in FIG. 1, with an additional holding element 9. The holding element 9 is deigned essentially like a cap. In this case the holding element 9 is fitted over the border 7 of the receptacle 2.

The holding element 9 is connected to the receptacle 2 by means of a latching and/or snap-in connection. For this, the holding element 9 comprises latching tabs 10. The latching tabs 10 of the holding element 9 are arranged and shaped in such manner that they engage in the latching openings 8 of the border 7 of the receptacle 2. In this illustration only one of the latching tabs 10 can be seen. The latching tabs 10 are arranged in the side areas 11, 12, 13 of the holding element 9. The three side areas 11, 12, 13 are arranged relative to one another in a U-shape that corresponds with the border 7.

The holding element 9 has a cover area 14, which faces away from the receptacle 2 and the closure element 1. Furthermore, the cover area 14 connects all the side areas 11, 12, 13 with one another. In this example embodiment, a spring tab 15 is arranged in the cover area 14. The spring tab 15 rests in contact against the electronic component 6. For that purpose the spring tab 15 is bent out of the plane of the cover area 14 in the direction toward the electronic component 6. In that way, on the one hand the electronic component 6 is additionally secured in the receptacle 2, and on the other hand a prestress is applied to the connection between the holding element 9 and the receptacle 2, so that it is additionally secured against undesired loosening.

Figure 3:
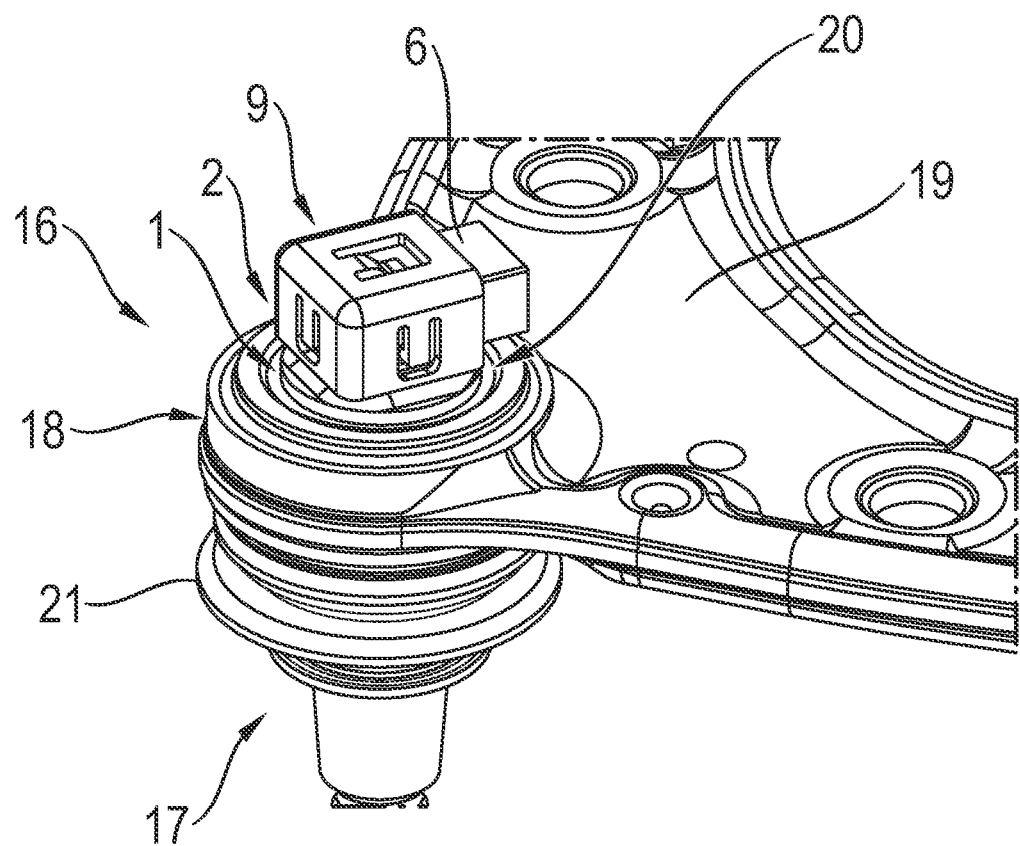
FIG. 3: A perspective side view of a ball joint according to the invention.

FIG. 3 shows a perspective side view of a ball joint 16 according to the invention. The ball joint 16 comprises a closure element 1 according to FIGS. 1 and 2. In this case the electronic component 6 is held reliably in the receptacle 2 by virtue of the additional holding element 9.

In this example embodiment the ball joint 16 is in the form of a ball pin joint. The ball joint 16 has an inner joint portion 17, here in the form of a ball pin. The inner joint portion 17 is arranged or fitted in a joint housing 18, with joint mobility. In this case, as an example, the joint housing 18 is at the same time an integral part of a chassis component 19. The chassis component 19 and the joint housing 18 are made as one piece. In this case, for example, the chassis component 19 is a control arm for a chassis of a motor vehicle (not shown here).

By means of the closure element 1 an opening 20 of the joint housing 18 is closed. Furthermore, the ball joint 16 has a sealing bellows 21, as is usual.

Figure 4:
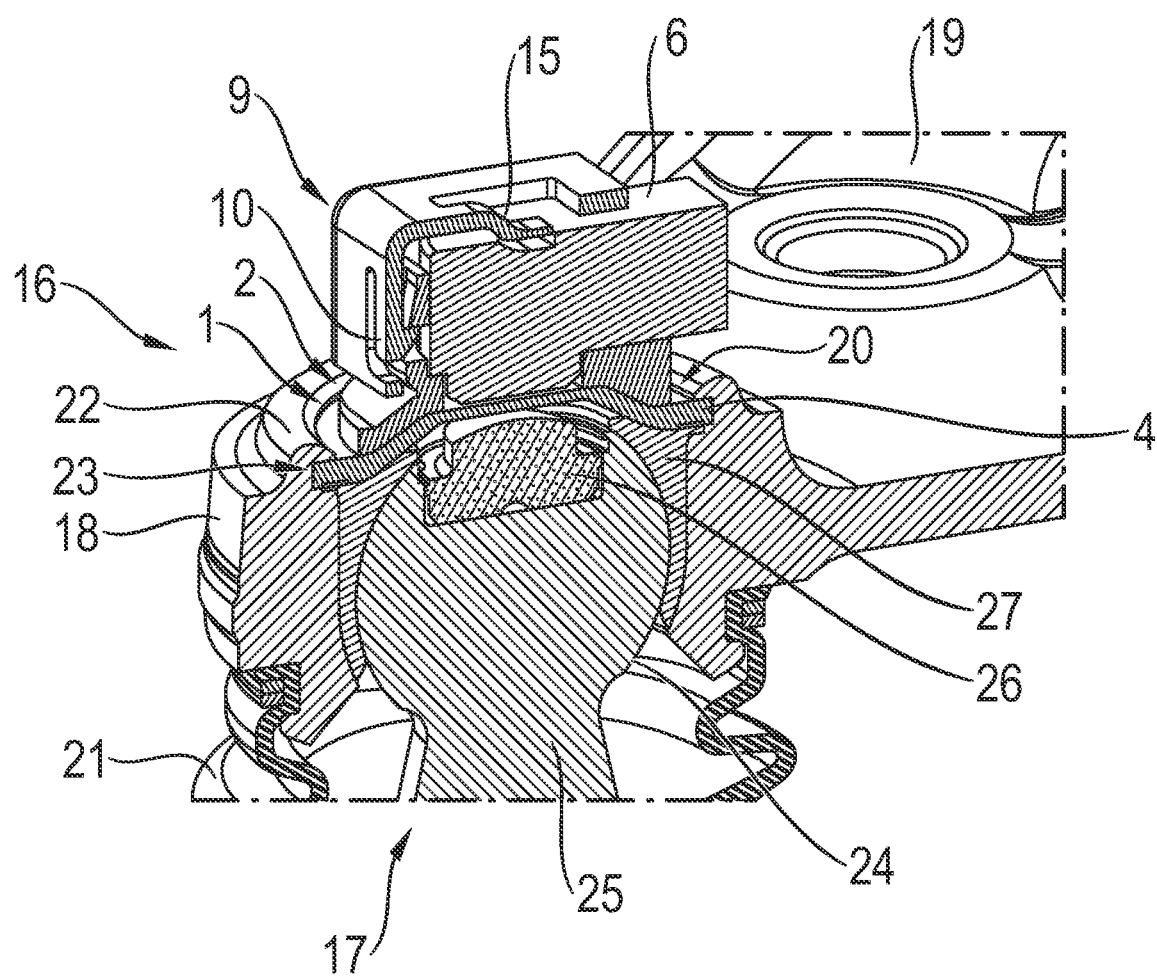
FIG. 4: A sectioned side view of the ball joint according to the invention shown in FIG. 3, FIG. 5: A perspective side view of a further closure element according to the invention.

FIG. 4 shows a sectioned side view of the ball joint 16 according to the invention, as shown in FIG. 3. To fix the closure element 1 onto the joint housing 18, the closure element 1 is inserted into the opening 20 and a housing edge 22 of the joint housing 18 is deformed or folded over to produce a holding groove 23 around the edge 4 of the closure element 1.

The inner joint portion 17 comprises a joint ball 24. Starting from the joint ball 24, a joint pin 25 of the inner joint portion 17 extends outwardly out of the joint housing 18. The opening 20 closed by the closure element 1 is located on a side of the joint housing 18 facing away from the joint pin 25.

In this example embodiment, on a front side of the joint ball 24 facing away from the joint pin 25, a magnet 26 is integrated in the joint ball 24. The magnet 26 co-operates with the electronic component 6 to form a sensor device.

In this example embodiment a joint shell 27 is arranged between the joint housing 18 and the joint ball 24. The joint shell 27 is made from a friction-optimized plastic.

Figure 5:
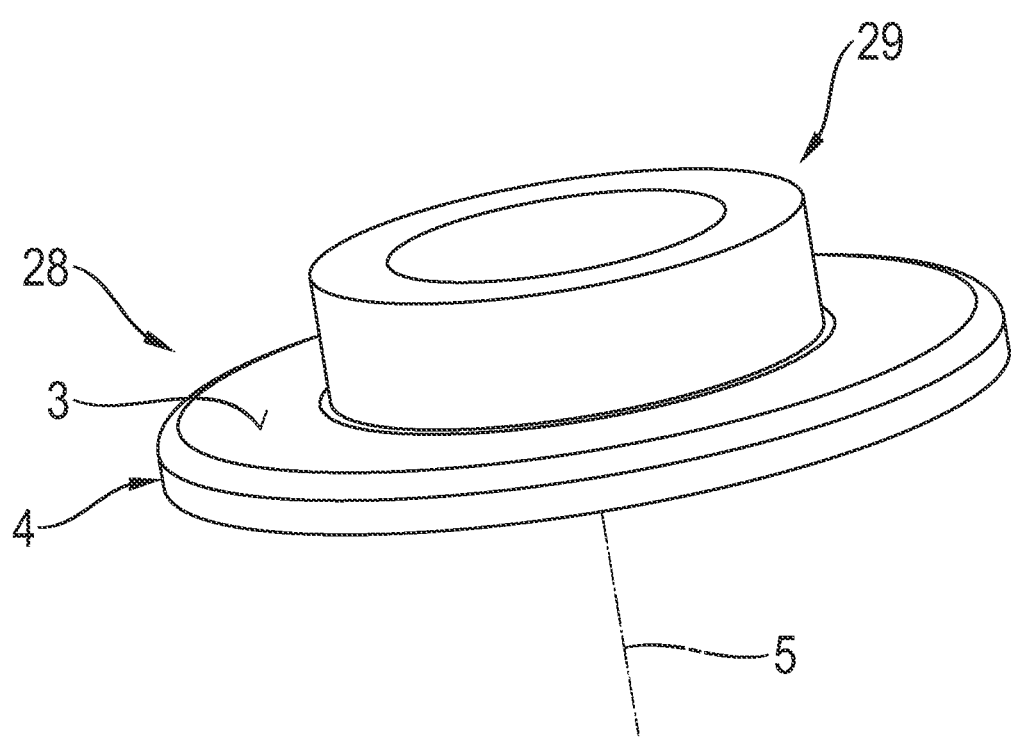

FIG. 5 shows a perspective side view of a further closure element 28 according to the invention. The closure element 28 corresponds largely to the closure element 1 according to FIGS. 1 to 3. Accordingly, reference should also be made to the preceding description.

The closure element 28 has a receptacle 29. In this case, the receptacle 29 is of annular structure, only as an example or in the sense of a place-maker. Alternatively, the receptacle 29 can be made essentially like the receptacle 2 shown in FIGS. 1 to 3. The receptacle 29 is again made from a plastic material and injection-molded onto the side 3 of the closure element 28.

Figure 6:
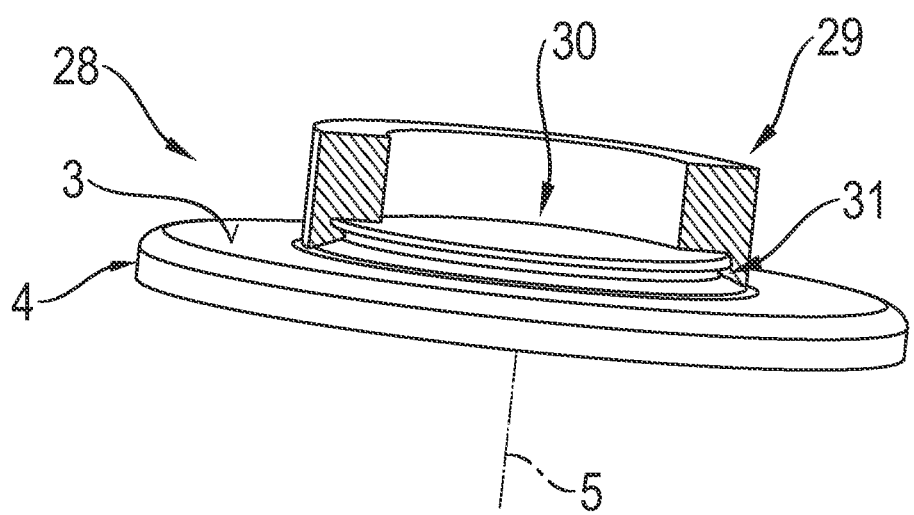
FIG. 6: A sectioned side view of the further closure element according to the invention shown in FIG. 5.

FIG. 6 shows a sectioned side view of the further closure element 28 according to the invention shown in FIG. 5. In contrast to the closure element 1 according to FIGS. 1 to 4, the closure element 28 shown here has an elevation 30 on the side 3.

Relative to its cross-section the elevation 30 is essentially T-shaped or shaped like a mushroom head. The elevation 30 serves to form an in particular additional, interlocking connection between the closure element 28 and the receptacle 29. Together with the side 3 the elevation 30 forms a groove 31 or undercut. The groove 31 is annular and extends radially around the central longitudinal axis 5 of the closure element 28. The receptacle 29, or the plastic material of the receptacle 29 engages in the groove 31 radially relative to the central longitudinal axis 5. This ensures a more reliable interlock between the receptacle 29 and the closure element 28.

INDEXES

1 Closure element
2 Receptacle
3 Side
4 Edge
5 Central longitudinal axis
6 Electronic component
7 Border
8 Latching aperture
9 Holding element
10 Latching tab
11 Side area
12 Side area
13 Side area
14 Cover area
15 Spring tab
16 Ball joint
17 Inner joint portion
18 Joint housing
19 Chassis component
20 Opening
21 Sealing bellows
22 Housing edge
23 Holding groove
24 Joint ball
25 Joint pin
26 Magnet
27 Joint shell
28 Closure element
29 Receptacle
30 Elevation
31 Groove

The invention claimed is:

1. A closure element of a ball joint (16) of a vehicle, the closure element comprising:

a top surface having a radially outer annular edge, the annular edge is connected to a joint housing, the joint housing defining a longitudinal axis and having an opening at an axial end thereof, the top surface of the closure element extends radially and the annular edge is received within the opening and fixed to the joint housing such that the top surface entirely encloses the opening and defines a joint interior of the ball joint, the top surface defines an exterior side of the closure element that axially faces away from the joint interior, a receptacle that is connected to the top surface of the closure element and has sides that axially extend from the top surface in a direction away from the joint interior and beyond an axial extent of the joint housing, the sides of the receptacle form a receptacle area within which the receptacle receives an electronic component, and the annular edge being fixed to the joint housing such that the top surface radially extends entirely across the opening and is located axially between the receptacle area and the receptacle on the exterior side of the closure element and the joint interior of the ball joint and axially separates the joint interior from the electronic component within the receptacle area, and the receptacle being made of a plastic material and being injection-molded onto the exterior side of the closure element.

2. The closure element according to claim 1, further comprising a holding element that is independent of the electronic component and the receptacle, the holding element having a cover and sides, the sides of the holding element have latching tabs that are engageable with latching openings located in the sides of the receptacle such that the holding element is connectable to the receptacle to hold the electronic component in the receptacle area axially between the top surface of the closure element and the cover of the holding element, wherein the exterior side of the closure element is either flat or planar.

3. The closure element according to claim 1, wherein the annular edge of the closure element projects radially, relative to a central longitudinal axisof the closure element, beyond the receptacle.

4. The closure element according to claim 1, wherein a material-merged, cohesive connection is formed between the exterior side of the closure element and the receptacle, and at least one of an adhesion-promoting agent is applied between the exterior side of the closure element and the receptacle, or the exterior side of the closure element, in an area envisaged for contacting the receptacle, is pretreated with a plasma process.

5. The closure element according to claim 1, wherein an interlocking connection is formed between the closure element and the receptacle, and the interlocking connection is produced by virtue of an undercut of the closure element.

6. The closure element according to claim 5, wherein the exterior side of the closure element has either a T-shaped or a mushroom-head-shaped elevation, located centrally relative to a central longitudinal axis of the closure element, and the receptacle engages in a groove of the elevation to form the interlocking connection, the groove of the elevation being an annular groove in a radially outer surface of the elevation.

7. The closure element according to claim 5, wherein at least one opening is arranged in the closure element, and to form the interlocking connection at least one of the plastic material of the receptacle extends through the at least one opening, or the at least one opening is filled with the plastic material of the receptacle.

8. The closure element according to claim 1, further comprising a holding element having sides that are releasably connectable to the sides of the receptacle to secure the electronic component within the receptacle, and the sides of the receptacle and the sides of the holding element being releasably connectable to one another by at least one of a latching connection and a snap-in connection, and the holding element and the receptacle each having a side that is open and aligned with each other such that the electronic component secured within the receptacle extends through the open sides of the holding element and the receptacle.

9. The closure element according to claim 1, wherein the closure element is designed as either a closure cap or a closure ring, and the closure element is made of a metal.

10. A ball joint with a closure element, the closure element of the ball joint comprising:

a receptacle accommodating an electronic component, the receptacle being made of a plastic material and being injection-molded onto a top side of the closure element, the ball joint having a joint housing, the joint housing defines a longitudinal axis and has an opening at an axial end thereof, the closure element being received within the opening and having an annular edge fixed to the joint housing such that the closure element entirely closes the opening of the joint housing, and the ball joint having an inner joint portion which is fitted into and movable within a joint interior of the joint housing, and the closure element being fixed to the joint housing such that the top side of the closure element with the receptacle axially faces away from the inner joint portion, and such that the top side of the closure element is axially located between the electronic component, which is receivable within the receptacle, and the inner joint portion and axially separates the electronic component from the inner joint portion, and the electronic component being accommodated within the receptacle such that the electronic component is removable from the receptacle while the closure element and the receptacle are fixed to the joint housing.

11. A closure element of a ball joint in a vehicle, the closure element comprising:

a radially outer edge that is configured to engage with the ball joint, the radially outer edge being fixed to a joint housing of the ball joint such that the closure element entirely encloses an opening of the joint housing on an axial first end of the joint housing opposite an axial second end of the joint housing through which a joint pin of the ball joint extends, the joint housing having a joint interior which extends axially from the closure element to the axial second end, the closure element having a receptacle formed of plastic and injection molded onto a top side of the closure element, the closure element being connected to the joint housing such that the top side of the closure element faces away from the joint interior and the receptacle extends beyond an axial extent of the joint housing, and an electronic component being received by the receptacle such that the electronic component is fixed in position relative to the closure element and the joint housing, and the top side of the closure element is axially located between the electronic component and the joint interior and axially separates the electronic component from the joint interior.

* * * * *